US012651816B2

(12) United States Patent
Yu et al.

(10) Patent No.: US 12,651,816 B2
(45) Date of Patent: Jun. 9, 2026

(54) TRANSMISSION LINE COMPRISING A SIGNAL CONDUCTING LAYER COVERED BY A SHIELDING LAYER WITH A GAP THEREIN

(71) Applicant: Skyworks Solutions, Inc., Irvine, CA (US)

(72) Inventors: Bo Yu, San Diego, CA (US); Xuanyi Dong, Irvine, CA (US); Bo Pan, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 134 days.

(21) Appl. No.: 18/500,971

(22) Filed: Nov. 2, 2023

(65) Prior Publication Data

US 2024/0154290 A1 May 9, 2024

Related U.S. Application Data

(60) Provisional application No. 63/423,408, filed on Nov. 7, 2022, provisional application No. 63/423,424, filed on Nov. 7, 2022.

(51) Int. Cl.
*H01P 3/00* (2006.01)

(52) U.S. Cl.
CPC .................................... *H01P 3/006* (2013.01)

(58) Field of Classification Search
CPC ....................................................... H01P 3/006
USPC .......................................................... 333/246
See application file for complete search history.

(56) References Cited

U.S. PATENT DOCUMENTS

| | | | | |
|---|---|---|---|---|
| 4,801,905 | A * | 1/1989 | Becker | H01P 3/081 174/117 FF |
| 2007/0241844 | A1* | 10/2007 | Kim et al. | H01P 3/003 333/238 |
| 2018/0131066 | A1* | 5/2018 | Laighton et al. | H05K 1/0219 |
| 2021/0126113 | A1 | 4/2021 | Lin et al. | |
| 2021/0134797 | A1 | 5/2021 | Lin et al. | |
| 2022/0093592 | A1 | 3/2022 | Guler et al. | |
| 2022/0271139 | A1 | 8/2022 | Su et al. | |
| 2024/0154286 | A1 | 5/2024 | Yu et al. | |

OTHER PUBLICATIONS

European Search Report in application No. EP 23206672.0, dated Apr. 24, 2024, in 9 pages.

* cited by examiner

*Primary Examiner* — Benny T Lee
(74) *Attorney, Agent, or Firm* — VIA LLP

(57) ABSTRACT

A transmission line can include a first conductive line, a second conductive line, a signal line disposed between the first conductive line and the second conductive line, with a first gap between the signal line and the first conductive line, and a second gap between the signal line and the second conductive line. A first shield can be disposed directly over a portion of the first gap, and a second shield can be disposed directly over a portion of the second gap. A slot can separate the first shield from the second shield. The transmission line can be a coplanar waveguide.

22 Claims, 15 Drawing Sheets

Related Art

Related Art

Related Art

Related Art

FREQUENCY (1 TO 60 GHz)

TRANSMISSION LINE COMPRISING A SIGNAL CONDUCTING LAYER COVERED BY A SHIELDING LAYER WITH A GAP THEREIN

CROSS REFERENCE TO RELATED APPLICATIONS

This application Claims the benefit of priority under 35 U.S.C. § 119 of U.S. Provisional Patent Application No. 63/423,408, filed Nov. 7, 2022 and titled "TRANSMISSION LINES WITH SLOTTED SHIELD," and U.S. Provisional Patent Application No. 63/423,424, filed Nov. 7, 2022 and titled "SHIELDED TRANSMISSION LINES," each of which is herein incorporated by reference in its entirety.

BACKGROUND

Technical Field

Embodiments of this disclosure relate to transmission lines, such as coplanar waveguides, and more particularly to shielding for transmission lines.

Description of Related Technology

Transmission lines can be used to transfer signals and/or power, such as to or from radio transmitters and/or receivers or antennas. In some implementations, the signal power can leak out of the transmission line and/or the transmission line can or couple with other transmission lines or other components.

Although various transmission lines exist, there remains a need for improved transmission lines, such as with improved shielding.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

In accordance with some aspects of the disclosure, a transmission line can include a dielectric layer that has a first side and a second side; a first conductive line disposed over the first side of the dielectric layer; a second conductive line disposed over the first side of the dielectric layer; a signal line disposed over the first side of the dielectric layer and between the first conductive line and the second conductive line, a first gap between the signal line and the first conductive line, and a second gap between the signal line and the second conductive line; a first shield disposed directly over a portion of the first gap; and a second shield disposed directly over a portion of the second gap, with a slot separating the first shield from the second shield.

The slot can be disposed directly above the signal line. The slot can have a width that is larger than a width of the signal line. The transmission line can include additional dielectric material that fills the first gap between the first conductive line and the signal line, and/or that fills the second gap between the second conductive line and the signal line. The additional dielectric material can be disposed over the first conductive line, the second conductive line, and the signal line, so that the additional dielectric material supports the first shield and the second shield.

The transmission line can include a conductive layer disposed over a second side of the dielectric layer. The transmission line can include one or more first interconnectors that extend through the dielectric layer to provide an electrical connection between the first conductive line and the conductive layer; and one or more second interconnectors that extend through the dielectric layer to provide an electrical connection between the second conductive line and the conductive layer. The one or more first interconnectors can include one or more vias, and/or the one or more second interconnectors can include one or more vias. The transmission line can include a first intermediate conductive portion between the first conductive line and the conductive layer; and a second intermediate conductive portion between the second conductive line and the conductive layer. The transmission line can include one or more vias that electrically interconnect the first conductive line to the first intermediate conductive portion; one or more vias that electrically interconnect the first intermediate conductive portion to the conductive layer; one or more vias that electrically interconnect the second conductive line to the second intermediate conductive portion; and one or more vias that electrically interconnect the second intermediate conductive portion to the conductive layer. The transmission line can include one or more vias that electrically interconnect the first shield to the first conductive line; and one or more vias that electrically interconnect the second shield to the second conductive line.

In accordance with some aspects of the disclosure, a method of making a transmission line can include providing a dielectric layer having a first side and a second side; forming a first conductive line over the first side of the dielectric layer; forming a second conductive line over the first side of the dielectric layer; forming a signal line over the first side of the dielectric layer and between the first conductive line and the second conductive line, with a first gap between the signal line and the first conductive line, and a second gap between the signal line and the second conductive line; forming a first shield disposed directly over a portion of the first gap; and forming a second shield disposed directly over a portion of the second gap, with a slot separating the first shield from the second shield.

The slot can be disposed directly above the signal line. The slot can have a width that is larger than a width of the signal line. The method can include forming additional dielectric material in the first gap between the first conductive line and the signal line, and in the second gap between the second conductive line and the signal line. The method can include forming the additional dielectric material over the first conductive line, the second conductive line, and the signal line, so that the additional dielectric material supports the first shield and the second shield.

The method can include forming a conductive layer over a second side of the dielectric layer. The method can include forming one or more first interconnectors that extend through the dielectric layer to provide an electrical connection between the first conductive line and the conductive layer; and forming one or more second interconnectors that extend through the dielectric layer to provide an electrical connection between the second conductive line and the conductive layer. The one or more first interconnectors can include one or more vias, and the one or more second interconnectors can include one or more vias. The method can include forming a first intermediate conductive portion over the dielectric layer, the first conductive line being provided directly above the first intermediate conductive portion; and forming a second intermediate conductive portion over the dielectric layer, the second conductive line being provided directly above the second intermediate conductive portion. The method can include forming one or more vias to electrically interconnect the first conductive line to the first intermediate conductive portion; forming one or more vias to electrically interconnect the first intermediate conductive portion to the conductive layer; forming one or more vias to electrically interconnect the second conductive line to the second intermediate conductive portion; and forming one or more vias to electrically interconnect the second intermediate conductive portion to the conductive layer. The method can include forming one or more vias to electrically interconnect the first shield to the first conductive line; and forming one or more vias to electrically interconnect the second shield to the second conductive line.

In accordance with some aspects of the disclosure, a transmission line can include a first conductive layer, a dielectric layer over the first conductive layer, and a second conductive layer over the dielectric layer and including first and second portions electrically connected to the first conductive layer and a third portion between the first portion and the second portion; a third conductive layer over the second conductive layer and including a first portion that covers at least a portion of, and extends inward past an end of, the first portion of the second conductive layer, and extends towards the third portion of the second conductive layer, the third conductive layer including a second portion that covers at least a portion of, and extends inward past an end of, the second portion of the second conductive layer, and extends towards the third portion of the second conductive layer; and a gap between the first portion of the third conductive layer and the second portion of the of the third conductive layer, the gap positioned directly over the third portion of the second conductive layer.

The transmission line can include one or more first interconnectors that extend through the dielectric layer to provide an electrical connection between the first conductive layer and the first portion of the second conductive layer; and one or more second interconnectors that extend through the dielectric layer to provide an electrical connection between the first conductive layer and the second portion of the second conductive layer. The transmission line can include an intermediate conductive layer, a first portion of the intermediate conductive layer between the first portion of the second conductive layer and the first conductive layer, a second portion of the intermediate conductive layer between the second portion of the second conductive layer and the first conductive layer. The transmission line can include one or more vias that electrically couple the first portion of the third conductive layer to the first portion of the second conductive layer, and one or more vias that electrically couple the second portion of the third conductive layer to the second portion of the second conductive layer. Dielectric material can fill a gap between the first portion of the second conductive layer and the third portion of the second conductive layer, and dielectric material can fill a gap between the second portion of the second conductive layer and the third portion of the second conductive layer. Dielectric material can support an overhang portion of the first portion of the third conductive layer that extends inward past the end of the first portion of the second conductive layer, and dielectric material can support an overhang portion of the second portion of the third conductive layer that extends inward past the end of the second portion of the second conductive layer. The transmission line can be a grounded coplanar waveguide.

In accordance with some aspects of the disclosure, a method of making a transmission line can include providing a dielectric material; forming a conductive layer over a first side of the dielectric material; patterning the conductive layer to have a first portion, a second portion, and a third portion that is positioned between the first portion and the second portion; forming an additional conductive layer over the first conductive layer; patterning the additional conductive layer to have a first portion and a second portion separated by a gap, the first portion of the additional conductive layer covering at least part of the first portion of the conductive layer and extending inward past an end of the first portion of the conductive layer, the second portion of the additional conductive layer covering at least part of the second portion of the conductive layer and extending inward past an end of the second portion of the conductive layer, the gap between the first and second portions of the additional conductive layer positioned directly over the third portion of the conductive layer.

The transmission line can be a coplanar waveguide. The method can include forming a ground plane conductive layer over a second side of the dielectric material. The method can include forming one or more first interconnectors that extend through the dielectric material to electrically couple the first portion of the conductive layer to the ground plane conductive layer, and forming one or more second interconnectors that extend through the dielectric material to electrically couple the second portion of the conductive layer to the ground plane conductive layer. The method can include forming an intermediate conductive layer between the dielectric material and the conductive layer; and patterning the intermediate conductive layer to provide a first portion and a second portion, the first portion of the conductive layer being provided directly above the first portion of the intermediate conductive layer, the second portion of the conductive layer being provided directly above the second portion of the intermediate conductive layer. The method can include forming one or more vias to electrically interconnect the first portion of the conductive layer to the first portion of the intermediate conductive layer; forming one or more vias to electrically interconnect the first portion of the intermediate conductive layer to the ground plane conductive layer; forming one or more vias to electrically interconnect the second portion of the conductive layer to the second portion of the intermediate conductive layer; and forming one or more vias to electrically interconnect the second portion of the intermediate conductive layer to the ground plane conductive layer. The method can include forming one or more vias to electrically interconnect the first portion of the additional conductive layer to the first portion of the conductive layer; and forming one or more vias to electrically interconnect the second portion of the additional conductive layer to the second portion of the conductive layer. The method can include forming additional dielectric material in a gap between the first portion of the conductive layer and the third portion of the conductive layer, and in a gap between the second portion of the conductive layer and the third portion of the conductive layer. The method can include forming the additional dielectric material over the conductive layer so that the additional dielectric material supports an overhang portion of the first portion of the additional conductive layer that extends inward past an end of the first portion of the conductive layer, and so that the additional dielectric material supports an overhang portion of the second portion of the additional conductive layer that extends inward past an end of the second portion of the conductive layer.

In accordance with some aspects of the disclosure, a transmission line can include a dielectric material; a layer of conductive material disposed over the dielectric material, the layer of conductive material having a first portion, a second portion, and a third portion that is positioned between and spaced apart from the first portion and the second portion; and an additional conductive layer over the first conductive layer, the additional conductive layer having a first portion and a second portion separated by a gap, the first portion of the additional conductive layer covering at least part of the first portion of the conductive layer and extending inward past an end of the first portion of the conductive layer, the second portion of the additional conductive layer covering at least part of the second portion of the conductive layer and extending inward past an end of the second portion of the conductive layer, the gap between the first and second portions of the additional conductive layer positioned directly over the third portion of the conductive layer.

The transmission line can be a coplanar waveguide. The transmission line can include a ground plane conductive layer over a second side of the dielectric material. The transmission line can include one or more first interconnectors that extend through the dielectric material to electrically couple the first portion of the conductive layer to the ground plane conductive layer; and one or more second interconnectors that extend through the dielectric material to electrically couple the second portion of the conductive layer to the ground plane conductive layer. The transmission line can include an intermediate conductive layer between the dielectric material and the conductive layer, the intermediate conductive layer having a first portion spaced apart from a second portion, the first portion of the intermediate conductive layer directly below the first portion of the conductive layer, and the second portion of the intermediate conductive layer directly below the second portion of the conductive layer. The transmission can include one or more vias that electrically interconnect the first portion of the conductive layer to the first portion of the intermediate conductive layer; one or more vias that electrically interconnect the first portion of the intermediate conducive layer to the ground plane conductive layer; one or more vias that electrically interconnect the second portion of the conductive layer to the second portion of the intermediate conductive layer; and one or more vias that electrically interconnect the second portion of the intermediate conducive layer to the ground plane conductive layer. The transmission line can include one or more vias that electrically interconnect the first portion of the additional conductive layer to the first portion of the conductive layer; and one or more vias that electrically interconnect the second portion of the additional conducive layer to the second portion of the conductive layer. The transmission can include additional dielectric material in a gap between the first portion of the conductive layer and the third portion of the conductive layer, and in a gap between the second portion of the conductive layer and the third portion of the conductive layer. The additional dielectric material can be disposed over the conductive layer so that the additional dielectric material supports an overhang portion of the first portion of the additional conductive layer that extends inward past an end of the first portion of the conductive layer, and so that the additional dielectric material supports an overhang portion of the second portion of the additional conductive layer that extends inward past an end of the second portion of the conductive layer.

In accordance with some aspects of the disclosure, a mobile device can include an antenna; a transceiver coupled to the antenna; and one or more transmission lines of any of the embodiments disclosed herein.

BRIEF DESCRIPTION OF THE DRAWINGS

Embodiments of this disclosure will now be described, by way of non-limiting example, with reference to the accompanying drawings, where like features are denoted by the same reference labels throughout the detailed description of the drawings.

DETAILED DESCRIPTION OF THE PREFERRED EMBODIMENTS

Figure 1:
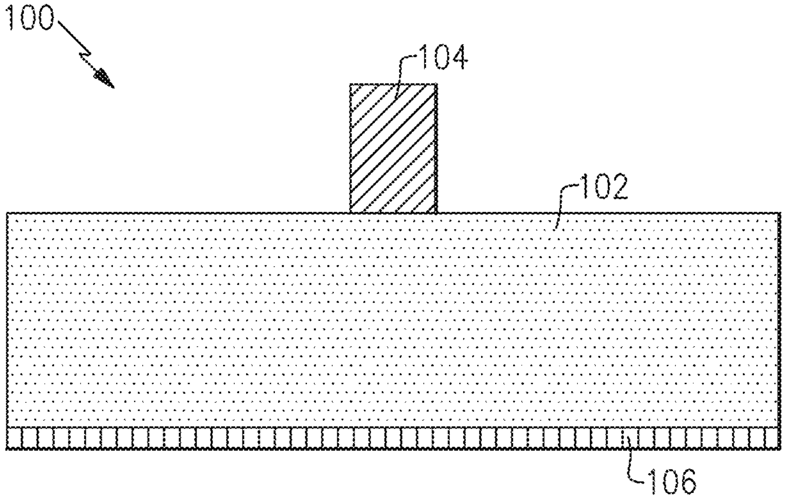
FIG.1 Related Art
FIG. 1 is a cross-sectional view of an example of a transmission line.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Transmission lines can be used to transfer power and/or signals. For example, some devices can have a feedback loop or calibration feature in which signal power is delivered to a location that is spaced away from the source of the signal, which can be a power amplifier. Transmission lines that extend over relatively long distances can have losses and/or coupling issues. For 5G and/or mmWave devices, the circuitry can be larger than for other types of devices, and in some cases longer transmission lines can be used, which can result in more loss and/or coupling.

Some embodiments disclosed herein can relate to transmission lines that include shielding to impede or reduce leakage and/or coupling for the transmission lines. In some implementations, the shielding can degrade the impedance for the transmission line, such as through capacitance between the signal lines and the shielding. Some embodiments disclosed herein can include one or more shielding elements that are disposed over and to the side of the signal line, so that the shielding element(s) can be spaced apart from the signal line sufficiently to provide good impedance, while also providing shielding to reduce leakage and/or coupling. The shielding can have a gap directly over the signal line.

FIG. 1 is a cross-sectional view of an example of a transmission line 100. The transmission line 100 can include a dielectric layer 102, a signal line 104, and a conductive layer 106. The transmission line 100 of FIG. 1 can be a microstrip line. The dielectric layer 102 can be a substrate. The dielectric layer 102 can include (e.g., be made of, consist of) a semiconductor material, such as silicon (Si) or gallium arsenide (GaAs), although various other suitable materials can be used. The signal line 104 can include (e.g., be made of, consist of) a conductive material, such as copper or aluminum, although various other metal or other suitable conductive materials can be used. The signal line 104 can be a strip of material that can carry a signal or power between locations. The conductive layer 106 can include (e.g., be made of, consist of) a conductive material, such as copper or aluminum, although various other metal or other suitable conductive materials can be used. The conductive layer 106 can be made of the same material as the signal line 104, although different materials can be used in some embodiments. The conductive layer 106 can be a ground plane, and can be coupled to ground in some cases.

The substrate or dielectric layer 102 can be disposed between the signal line 104 and the conductive layer 106. In some implementations, the substrate (e.g., insulating or dielectric layer) 102 can be formed or provided. The signal line 104 can be formed on or over a first side of the substrate 102 (e.g., deposited thereon, attached or adhered thereto). In some embodiments, the conductive layer 106 can formed on or over a second side of the substrate 102 (e.g., deposited thereon, attached or adhered thereto), which can be opposite the first side.

Figure 2:
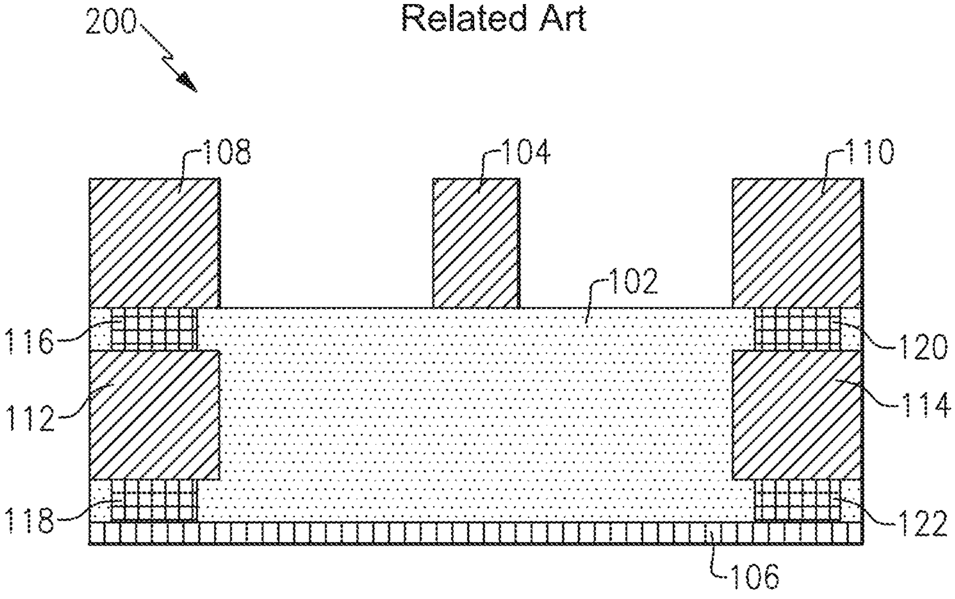
FIG. 2 is a cross-sectional view of another example of a transmission line.

FIG. 2 shows a cross-sectional view of an example of a transmission line 200. The transmission line 200 can have a dielectric material or layer 102, a signal line 104, a first conductive line 108, and a second conductive line 110. The transmission line 200 of FIG. 2 can be a coplanar waveguide. The dielectric material 102 can be a substrate. The dielectric material 102 can include (e.g., be made of, consist of) a semiconductor material, such as silicon (Si) or gallium arsenide (GaAs), although various other suitable materials can be used. The signal line 104 can include (e.g., be made of, consist of) a conductive material, such as copper or aluminum, although various other metal or other suitable conductive materials can be used. The signal line 104 can be a strip of material that can carry a signal or power between locations. The first conductive line 108 and/or the second conductive line 110 can include (e.g., be made of, consist of) a conductive material, such as copper or aluminum, although various other metal or other suitable conductive materials can be used. The first and second conductive lines 108, 110 can be made of the same material as the signal line 104. For example, a layer of conductive material can be formed on or over the substrate or dielectric layer 102 (e.g., deposited, attached or adhered thereto), and the layer of conductive material can be patterned to form separate portions to provide the signal line 104, the first conductive line 108, and the second conductive line 110. The signal line 104 can be disposed between the first conductive line 108 and the second conductive line 110. The first and second conductive lines 108, 110 can be strips of the conductive material, and can extend generally parallel with the signal line 104. The first and second conductive lines 108, 110 can be spaced apart from the signal line 104 by gaps. The gaps can be filled with air or another insulating or dielectric material. The first conductive line 108 and the second conductive line 110 can be return lines, which can carry a return current. The first conductive line 108 and the second conductive line 110 can be ground lines, and can be coupled to ground.

The transmission line 200 can include a conductive layer 106. The transmission line 200 can be a grounded coplanar waveguide. The conductive layer 106 can include (e.g., be made of, consist of) a conductive material, such as copper or aluminum, although various other metal or other suitable conductive materials can be used. The conductive layer 106 can be made of the same material as the signal line 104, although different materials can be used in some embodiments. The conductive layer 106 can be a ground plane, and can be coupled to ground in some cases. The signal line 104, the first conductive line 108, and the second conductive line 110 can be formed on or over a first side of the dielectric material 102 (e.g., deposited thereon, attached or adhered thereto). The conductive layer 106 can formed on or over a second side of the dielectric material 102 (e.g., deposited thereon, attached or adhered thereto), which can be opposite the first side.

The conductive layer 106 can be electrically coupled to the first conductive line 108 and/or to the second conductive line 110. The transmission line 200 can include one or more first interconnectors that can extend between or otherwise electrical connect the conductive layer 106 to the first conductive line 108. The transmission line 200 can include one or more second interconnectors that can extend between or otherwise electrical connect the conductive layer 106 to the second conductive line 110. The one or more first interconnectors can include one or more first vias. The one or more second interconnectors can include one or more second vias. The first and second interconnectors can include one or more conductive layers, which in some cases can be inside (e.g., embedded within) the dielectric material 102. The example of FIG. 2 has one conductive layer, although two, three, or any suitable number of conductive layers could be used. The dielectric material 102 can be formed layer-by-layer with the one or more conductive layers. The conductive layer can be formed and then patterned to form separate conductive portions. A first conductive portion 112 can be directly under the first conductive line 108 (e.g., having footprints that at least partially overlap). A second conductive portion 114 can be directly under the second conductive line 110 (e.g., having footprints that at least partially overlap). In some cases, the conductive portions 112, 114 can be considered intermediate conductive portions, being positioned between the respective conductive lines 108, 110 and the conductive layer 106. One or more vias 116 can extend through part of the dielectric material 102 to electrically interconnect the first conductive line 108 to the first conductive portion 112. One or more vias 118 can extend through part of the dielectric material 102 to electrically interconnect the first conductive portion 112 to the conductive layer 106. One or more vias 120 can extend through part of the dielectric material 102 to electrically interconnect the second conductive line 110 to the second conductive portion 114. One or more vias 122 can extend through part of the dielectric material 102 to electrically interconnect the second conductive portion 114 to the conductive layer 106. In some cases, the conductive layer or first and second portions 112, 114 can be omitted. For example, the vias 116 can extend through the dielectric material 102 to electrically connect the first conductive line 108 to the conductive layer 106, and the vias 120 can extend through the dielectric material 102 to electrically connect the second conductive line 110 to the conductive layer 106.

Figure 3:
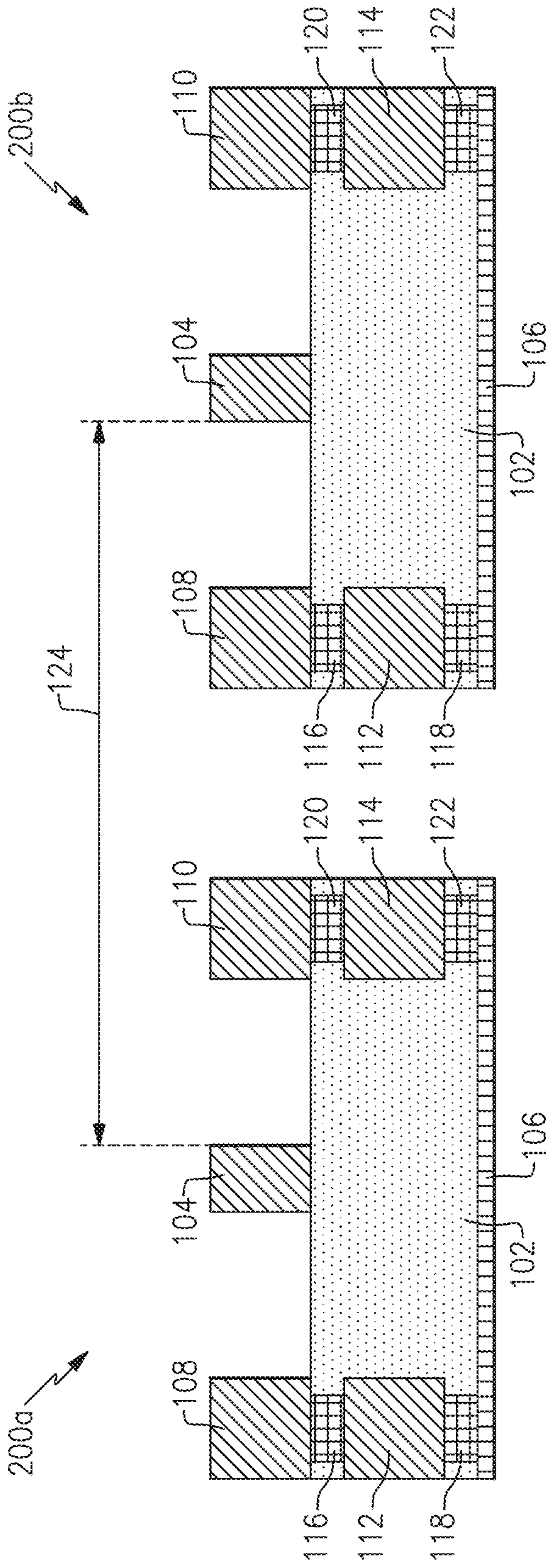
FIG. 3 shows two transmission lines separated by a distance.

FIG. 3 shows two transmission lines 200*a* and 200*b*, which can be similar to the transmission line 200 of FIG. 2 (e.g., coplanar waveguides). The transmission lines 200*a* and 200*b* can be positioned so that their respective signal lines 104 can be spaced apart by a distance 124 (e.g., measured from a first side of the signal line 104 of the first transmission line 200*a* to a second side of the signal line 104 of the second transmission line 200*b*).

Figure 4:
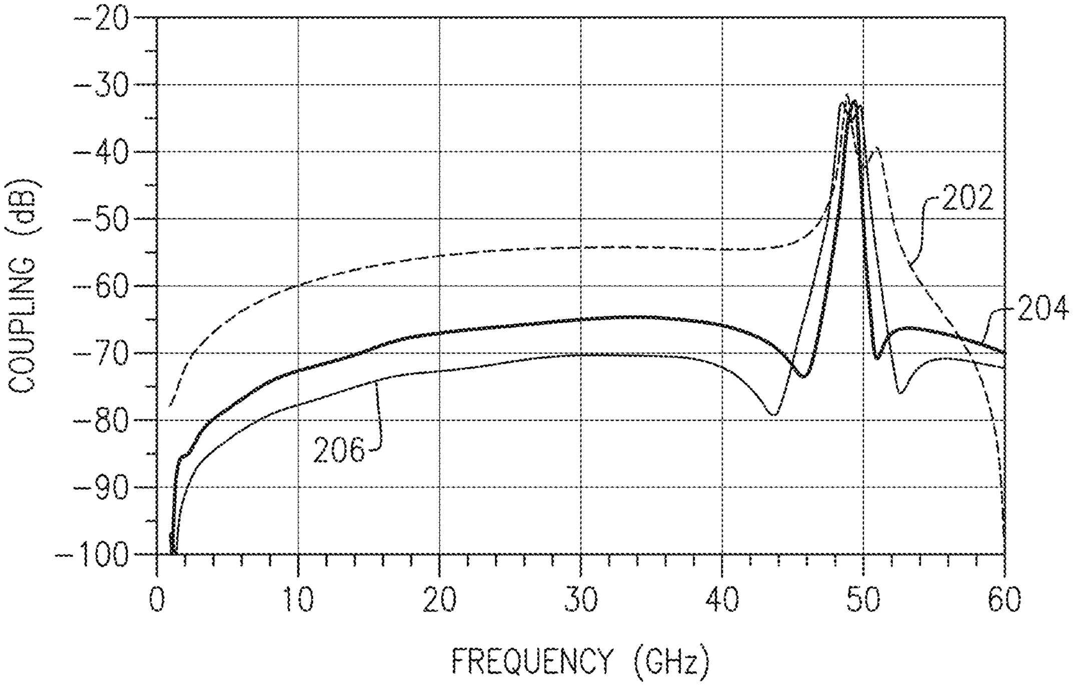
FIG. 4 is a graph comparing coupling between transmission lines separated by different distances.

FIG. 4 is a graph showing plots of coupling ("COUPLING") in decibels (dB versus frequency ("FREQUENCY") in gigahertz (GHz), between transmission lines 200*a*, 200*b* that are coupled similar to the example of FIG. 3, for different distances 124. Line 202 corresponds to coupling between transmission lines 200*a*, 200*b* with signal lines 104 that are spaced apart by a distance 124 of 40 microns. Line 204 corresponds to coupling between transmission lines 200*a*, 200*b* with signal lines 104 that are spaced apart by a distance 124 of 80 microns. Line 206 corresponds to coupling between transmission lines 200*a*, 200*b* with signal lines 104 that are spaced apart by a distance 124 of 120 microns. The transmission lines 200*a*, 200*b* that are positioned closer together can experience more coupling than the transmission lines 200*a*, 200*b* that are positioned further apart. In some cases, the coupling between the transmission lines 200*a* and 200*b* can be higher at a resonant frequency (e.g., about 50 GHz in the example of FIG. 4). At the resonant frequency significant coupling can occur even if the transmission lines 200*a* and 200*b* are spaced further apart. For example, the arrangement of line 206 (e.g., 120 micron spacing) can have more coupling at the resonant frequency (e.g., about 50 GHZ) than the arrangement of line 202 (e.g., 40 micron spacing) at non-resonant frequencies (e.g., 0 to 45 GHz). At the resonant frequency (e.g., about 50 GHZ), the three examples represented by lines 202, 204 and 206 can all have generally comparable amounts of coupling, despite having different spacing (e.g., 40 microns, 80 microns, and 120 microns).

Figure 5:
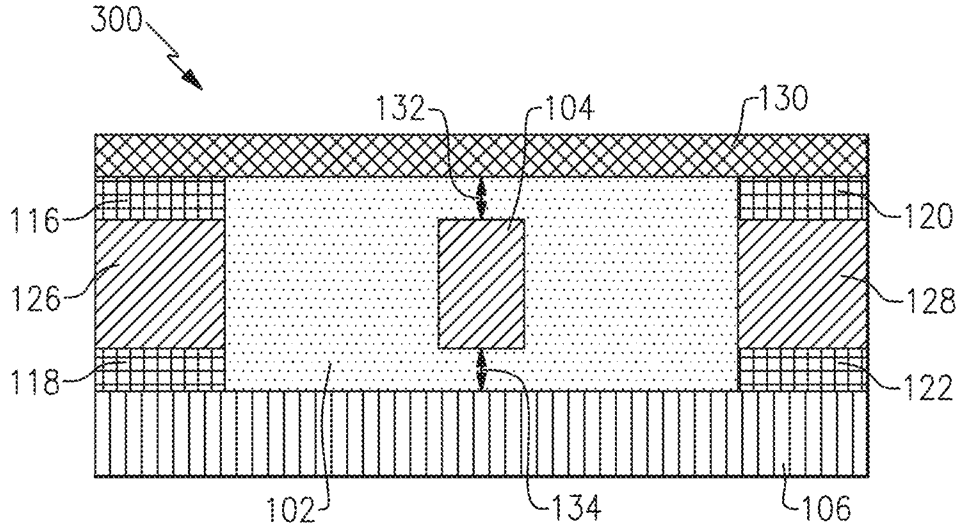
FIG. 5 is a cross-sectional view of another example of a transmission line.

FIG. 5 is a cross-sectional view of an example of a transmission line 300. The transmission line 300 of FIG. 3 can be a stripline. The transmission line 300 can have a dielectric material or layer 102, which can be a substrate in some implementations. A signal line 104 can be disposed inside the dielectric material 102. A conductive layer 130 can be disposed on or over a first side of the dielectric material 102. A conductive layer 106 can be disposed on or over a second side of the dielectric material 102, which can be opposite the first side. The conductive layer 130 can include (e.g., be made of, consist of) aluminum or copper, although various other conductive materials could be used. The conductive layer 106 can be coupled to ground and/or the conductive layer 130 can be coupled to ground. The conductive layer 130 can be a first ground plane, and the conductive layer 106 can be a second ground plane, in some implementations. The conductive layer 130 can extend directly over the signal line 104, and can cover the signal line 104.

In some cases, the conductive layer 130 can be electrically coupled to the conductive layer 106, such by one or more vias or other interconnections. In the example of FIG. 5, the transmission line 300 can have a first conductive portion 126 one side and a second conductive portion 128 on another side. The conductive portions 126, 128 can be formed from the same layer of material as the signal line 104. A layer of conductive material can be formed (e.g., deposited) and the layer can be patterned to form separate sections for the signal line 104, the first conductive portion 126, and the second conductive portions 128. The conductive portions 126, 128 can be return lines and/or ground lines. One or more vias 116 can extend through part of the dielectric material 102 to electrically interconnect the conductive layer 130 to the first conductive portion 126. One or more vias 118 can extend through part of the dielectric material 102 to electrically interconnect the first conductive portion 126 to the conductive layer 106. One or more vias 120 can extend through part of the dielectric material 102 to electrically interconnect the conductive layer 130 to the second conductive portion 128. One or more vias 122 can extend through part of the dielectric material 102 to electrically interconnect the second conductive portion 128 to the conductive layer 106. In some cases, the conductive portions 126, 128 can be omitted. For example, the vias 116 can extend through the dielectric material 102 to electrically connect the conductive layer 130 to the conductive layer 106 (e.g., on the first side), and/or the vias 120 can extend through the dielectric material 102 to electrically connect the conductive layer 130 to the conductive layer 106 (e.g., on the second side).

The transmission line 300 of FIG. 5 can have less coupling than the transmission line 200 of FIG. 2. For example, the conductive layer 130 can provide shielding the impedes leakage or coupling. However, the conductive layer 130 can also degrade or lower the impedance of the transmission line 300. In some cases, the transmission line 300 can have worse transmission than the transmission line 200, despite the shielding. The conductive layer 130 can be disposed directly over the signal line 104. The signal line 104 can be spaced a distance 132 from the conductive layer 130. The conductive layer 106 can be disposed directly under the signal line 104. The signal line 104 can be spaced a distance 134 from the conductive layer 106. The smaller the distances 132 and/or 134, the more capacitance is created between the signal line 104 and the conductive layer 106 and/or conductive layer 130. The smaller the distances 132 and/or 134 the lower the impedance for the transmission line 300, which can degrade the performance of the transmission.

Figure 6:
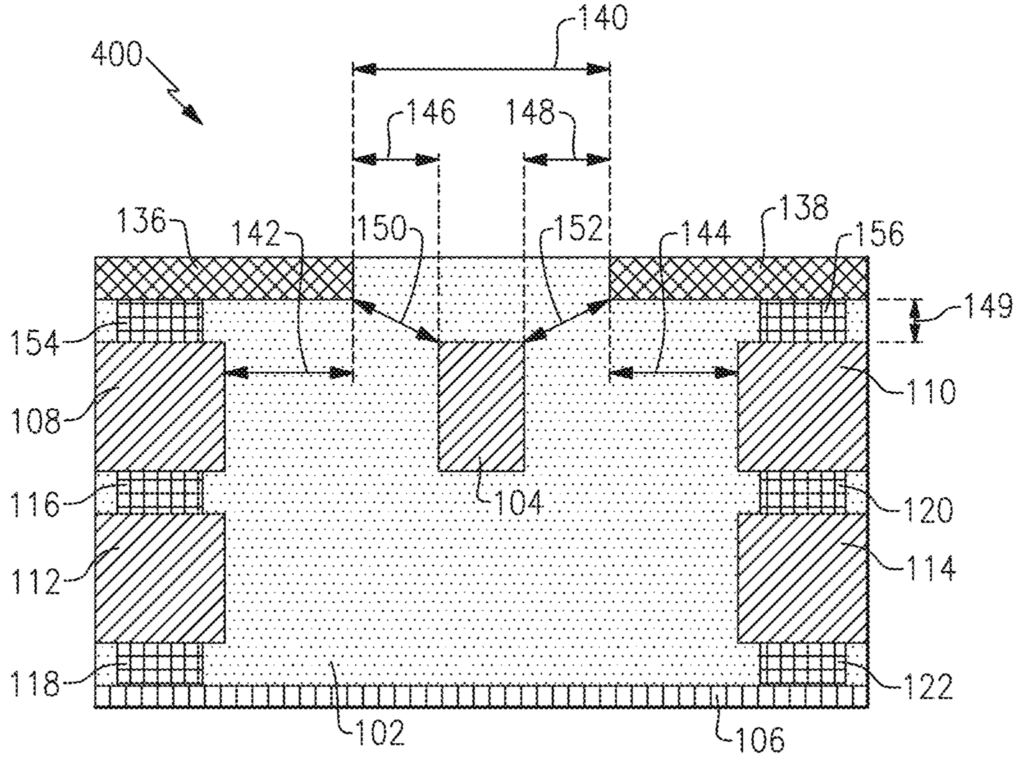
FIG. 6 is a cross-sectional view of another example of a transmission line.

FIG. 6 is a cross-sectional view of an example of a transmission line 400. The transmission line 400 can be a coplanar waveguide, such as a grounded coplanar waveguide. The transmission line 400 can be similar to the transmission line 200 of FIG. 2, except as discussed herein. The transmission line 400 can include a dielectric material 102, a signal line 104, a first conductive line 108, and a second conductive line 110. The signal line 104, the conductive line 108, and/or the conductive line 110 can be disposed inside the dielectric material 102 (e.g., embedded therein). The dielectric material 102 can be formed layer-by-layer and can be built up along with the other layers of the transmission line 400. The transmission line 400 can include a first shield element 136 and a second shield element 138, which can be spaced apart by a gap. The gap can be disposed directly over the signal line 104. The first shield element 136 and/or the second shield element 138 can extend inward towards the signal line 104, but do not extend directly over the signal line 104. The gap between the shield elements 136, 138 can have a width 140.

The first shield element 136 and/or the second shield element 138 can include (e.g., be made of, consist of) a conductive material such as aluminum, although copper or various other suitable materials could be used. The first shield element 136 and the second shield element 138 can be formed of the same layer of material. For example, a layer of conductive material can be formed, such as on or over the dielectric material 102 (e.g., deposited thereon, attached or adhered thereto), and the layer of conductive material can be patterned to form the separate shield elements 136, 138, such as by removing material to form the gap. The first shield element 136 and/or the second shield line can be strip(s) of material that can extend generally parallel to the signal line 104, the conductive line 108, and/or the conductive line 110. The gap can provide a slot between the shield elements 136, 138. The first shield element 136 can be disposed directly over the first conductive line 108 (e.g., return line or ground line).

The first shield element 136 can extend inward (e.g., toward the signal line 104 or towards the second shield line 138) past an end of the first conductive line 108 by a distance 142. The first shield element 136 can have an overhang portion that extends past the first conductive line 108. The dielectric material 102 can support the overhang portion of the first shield element 136. The second shield element 138 can extend inward (e.g., toward the signal line 104 or towards the first shield line 136) past an end of the second conductive line 110 by a distance 144, which can be the same as, or different from, the distance 142. The second shield element 138 can have an overhang portion that extends past the second conductive line 110. The dielectric material 102 can support the overhang portion of the second shield element 138.

The first shield element 136 can be spaced laterally away from the signal line 104 by a distance 146. The second shield element 138 can be spaced laterally away from the signal line 104 by a distance 148, which can be the same as, or different from, the distance 146. The shield element 136 and/or the shield element 138 can be raised above the signal line 104 by a distance 149. The distance 150 is the spacing between the closest points of the signal line 104 and the first shield element 136. The distance 152 is the spacing between the closest points of the signal line 104 and the second shield element 138.

The transmission line 400 can include one or more vias 154, which can extend through part of the dielectric material 102 to electrically interconnect the first shield element 136 to the first conductive line 108. The transmission line 400 can include one or more vias 156, which can extend through part of the dielectric material 102 to electrically interconnect the second shield element 138 to the second conductive line 110. The first shield element 136 can be electrically coupled to the conductive layer 106, such as by the via(s) 154, the first conductive line 108, the via(s) 116, the first conductive portion 112, and the via(s) 118. The second shield element 138 can be electrically coupled to the conductive layer 106, such as by the via(s) 156, the second conductive line 110, the via(s) 120, the second conductive portion 114, and the via(s) 122. Various alternatives are possible. For example, the conductive portions 112, 114 can be omitted, and the via(s) 116 can extend between the conductive line 108 and the conductive layer 106, and the via(s) 120 can extend between the conductive line 110 and the conductive layer 106. In some embodiments, one or more additional layers of conductive portions and vias can be added similar to the conductive portions 112, 114 and the vias 118 and 122, such as to form a taller stack of layers.

Figure 7:
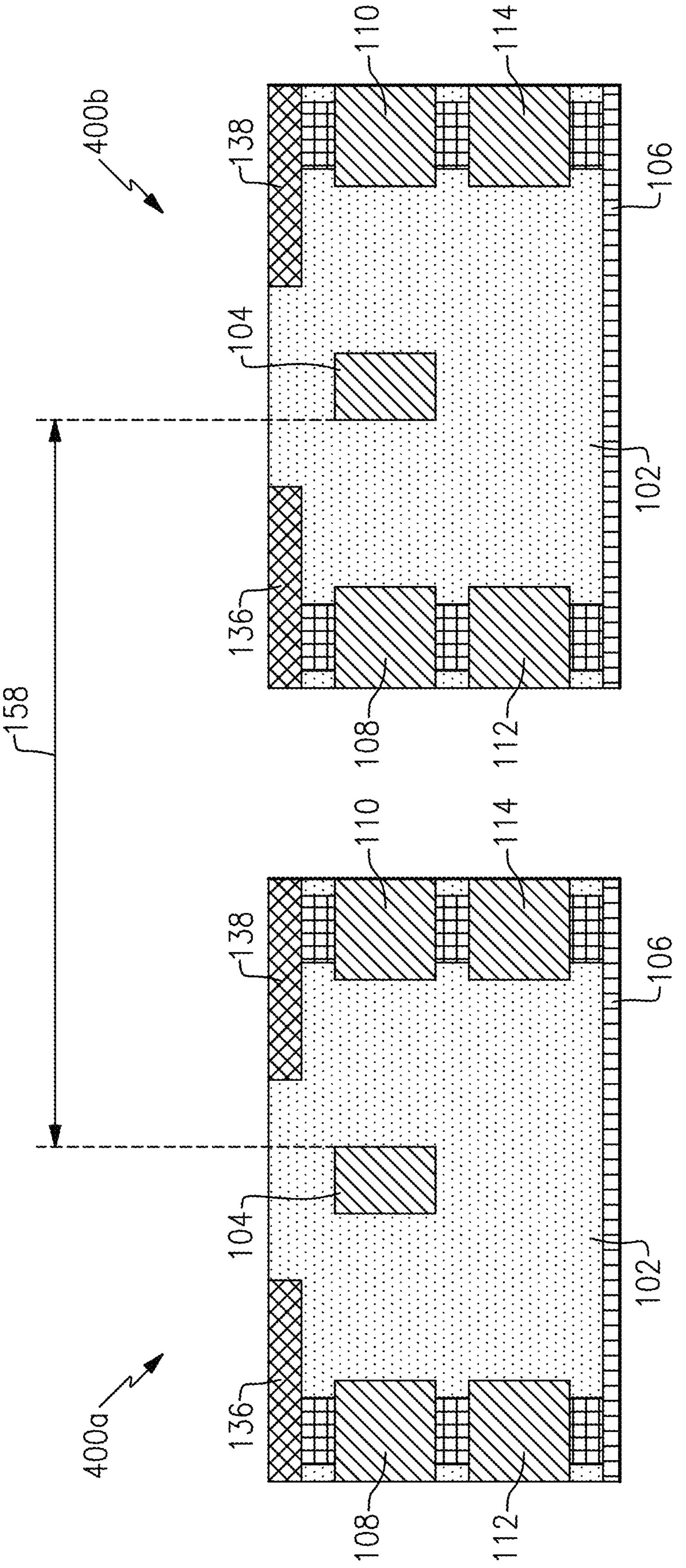
FIG. 7 shows two transmission lines separated by a distance.

FIG. 7 shows two transmission lines 400*a* and 400*b*, which can be similar to the transmission line 400 of FIG. 6 (e.g., slot-type shielded coplanar waveguides). The transmission lines 400*a* and 400*b* can be positioned so that their respective signal lines 104 are spaced apart by a distance 158 (e.g., measured from a first side of the signal line 104 of the first transmission line 400*a* to a second side of the signal line 104 of the second transmission line 400*b*).

Figure 8:
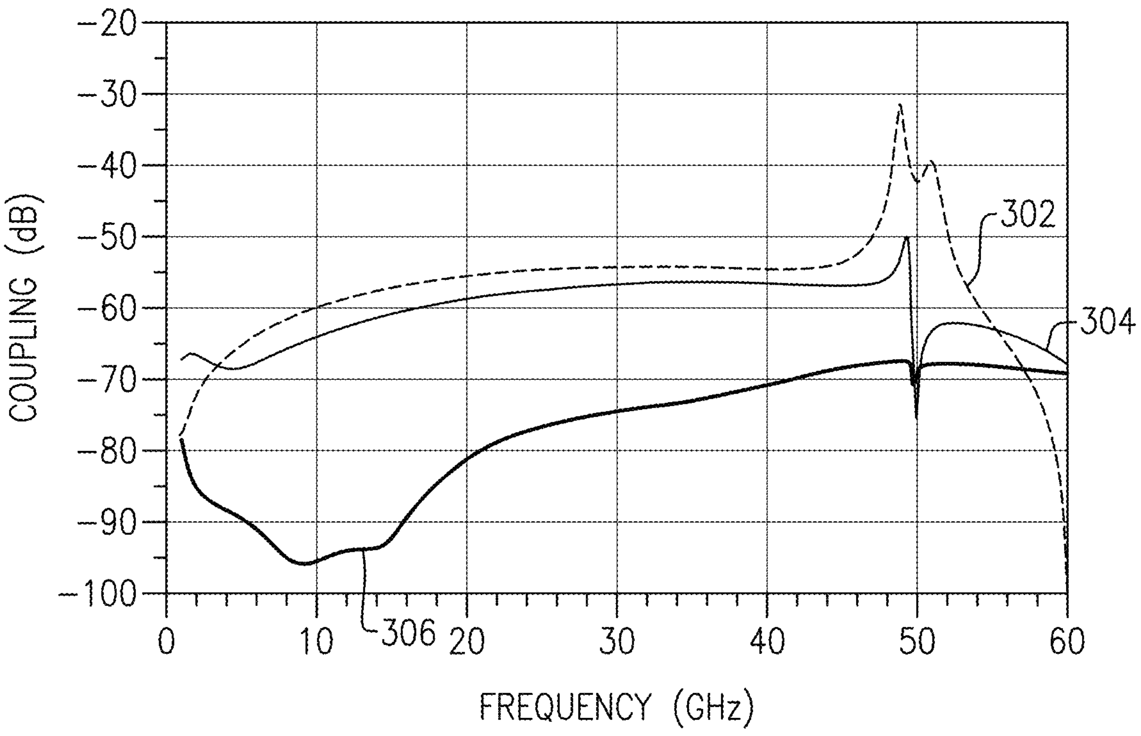
FIG. 8 is a graph comparing coupling between different types of transmission lines.

FIG. 8 is a graph showing plots of coupling ("COUPLING") in decibels (dB) versus frequency ("FREQUENCY") in gigahertz (GHz), between various types of transmission lines. Line 302 corresponds to coupling between transmission lines 200*a* and 200*b* (e.g., grounded coplanar waveguides, as in FIG. 3) with signal lines 104 that are spaced apart by a distance 124 of 40 microns (e.g., similar to line 202 in FIG. 4). Line 304 corresponds to coupling between transmission lines 400*a* and 400*b* (e.g., grounded coplanar waveguides with slot-type shielding, as in FIG. 7) with signal lines 104 that are spaced apart by a distance 158 of 40 microns. Line 306 corresponds to coupling between two transmission lines 300 that have the configuration of FIG. 5 (e.g., stripline), with signal lines 104 that are spaced apart by a distance of 40 microns. As can be seen by comparing line 304 to line 302, adding the shielding elements 136, 138 can reduce coupling for the transmission line 400. As can be seen from line 306, the conductive layer 130 can provide additional shielding, which can further reducing coupling for the transmission line 300.

Figure 9:
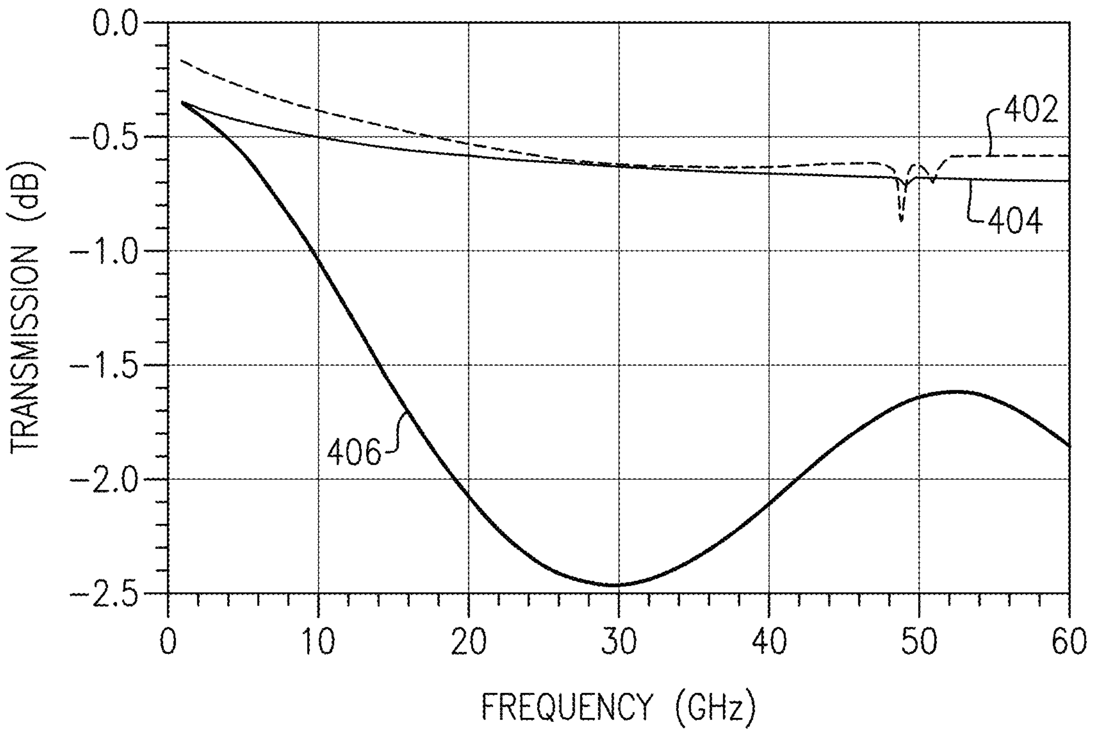
FIG. 9 is a graph comparing transmission for different types of transmission lines.

FIG. 9 is a graph showing plots of transmission ("TRANSMISSION") in decibels (dB) versus frequency ("FREQUENCY") in gigahertz (GHz), for various types of transmission lines. Line 402 corresponds to transmission for a transmission line 200 (e.g., a grounded coplanar waveguides, as in FIG. 2). Line 404 corresponds to transmission for a transmission line 400 (e.g., a grounded coplanar waveguides with slot-type shielding, as in FIG. 6). Line 406 corresponds to transmission for a transmission line 300 (e.g., a stripline, as in FIG. 5). As can be seen from line 406 in FIG. 9, the transmission line 300 (e.g., FIG. 5) can have significantly worse transmission than the transmission line 200 (e.g., FIG. 2) and the transmission line 400 (e.g., FIG. 6). As discussed herein, the conductive layer 130 can provide effective shielding, which can yield low coupling, but can also result in low impedance, and can yield low transmission. By comparing lines 402 and 404, it can be seen that the shielding elements 136, 138 can reduce transmission some, but not nearly to the degree of the full conductive layer 130. In FIG. 9, the line 402 shows that the transmission line 200 can provide better transmission, but at the cost of worse coupling as shown in FIG. 8.

Figure 10:
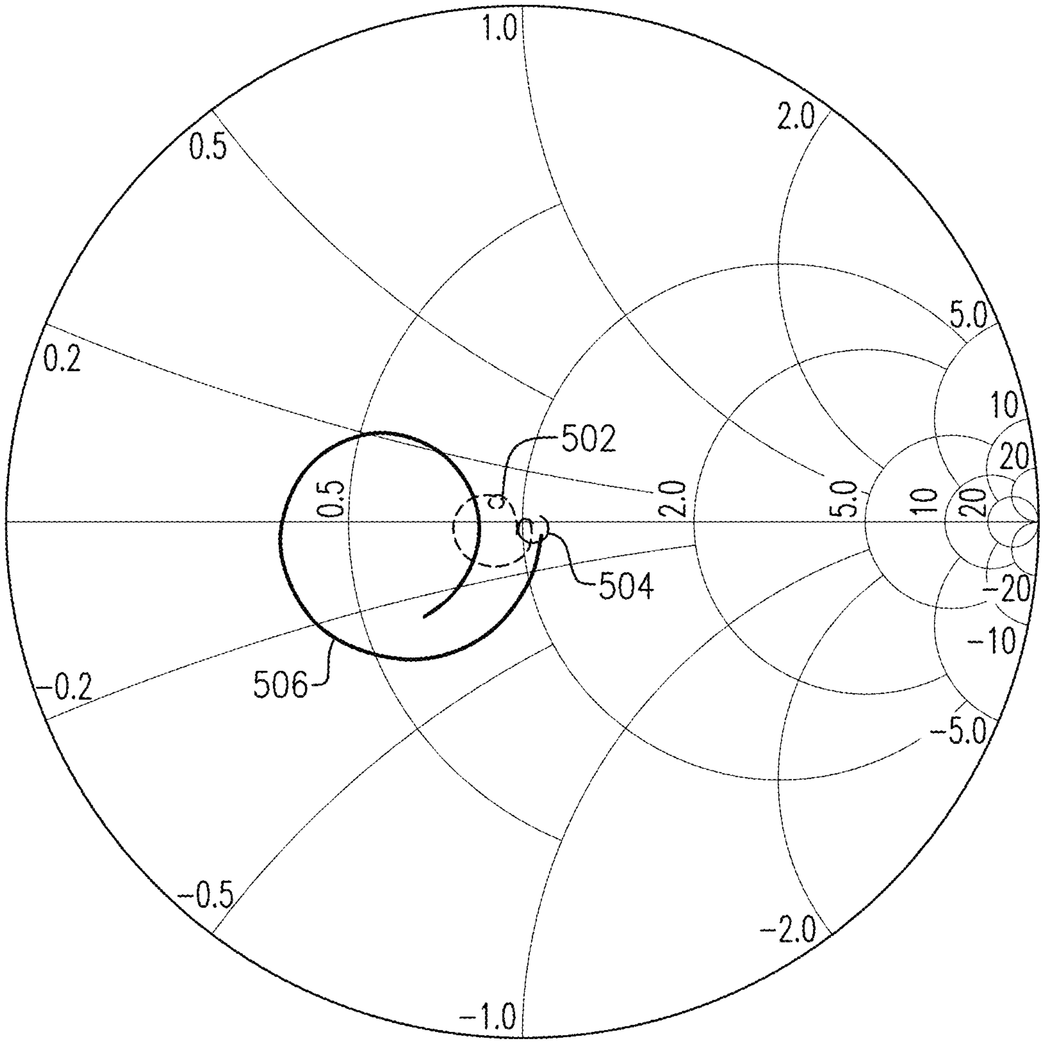
FIG. 10 is a Smith chart comparing different types of transmission lines.

FIG. 10 is a chart that illustrates the reflection coefficient for various types of transmission lines, for a frequency range ("FREQUENCY") of 1 to 60 gigahertz (GHz). The chart of FIG. 10 shows higher impedance on the right of the chart and lower impedance on the left side of the chart. Line 502 corresponds to a transmission line 200 (e.g., a grounded coplanar waveguides, as in FIG. 2). Line 504 corresponds to a transmission line 400 (e.g., a grounded coplanar waveguides with slot-type shielding, as in FIG. 6). Line 506 corresponds to a transmission line 300 (e.g., a stripline, as in FIG. 5). As can be seen from lines 502, 504, and 506, the transmission line 400 (e.g., FIG. 6) can have higher impedance than the transmission line 200 (e.g., FIG. 2) or the transmission line 300 (e.g., FIG. 5).

If the shielding element(s) 136, 138 were made larger, so that they extend further inward and provide a smaller gap width 140, that can result in less coupling (e.g., the line 304 would be shifted downward closer to line 306 in FIG. 8), but that could also yield less transmission (e.g., the line 404 would be shifted downward closer to line 406 in FIG. 9). If the shielding element(s) 136, 138 were made smaller, so that they extend less distance inward and provide a larger gap width 140, that can result in more coupling (e.g., the line 304 would be shifted upward towards line 302 in FIG. 8), but that could also yield more transmission (e.g., the line 404 would be shifted upward closer to line 402 in FIG. 9). The shielding elements 136, 138 can be configured to balance the goal of providing effective shielding, such as to reduce coupling or leakage, with the goal of providing high transmission. Depending on the particular needs of an application, the shield elements 136, 138 can be sized appropriately to provide adequate transmission while reducing coupling or leakage.

Figure 11:
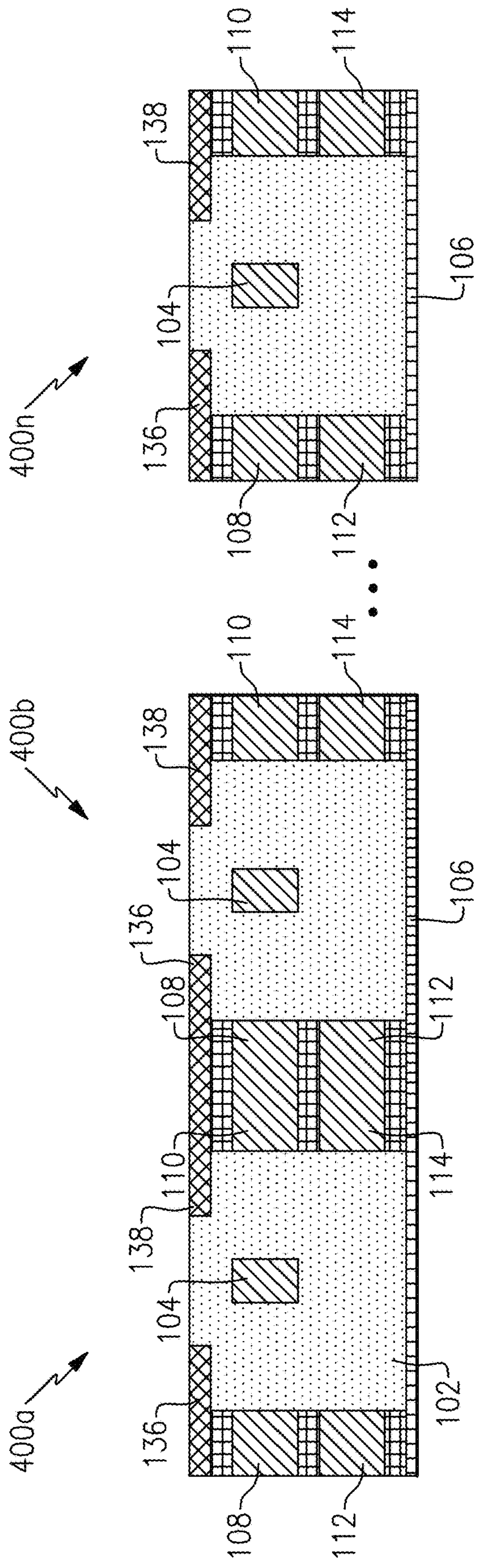
FIG. 11 shows multiple transmission lines integrated into a single assembly.

FIG. 11 shows an example of multiple transmission lines 400*a*, 400*b*, 400*n* incorporated into a single device. The transmission lines 400*a*, 400*b*, 400*n* can share a common conductive layer 106. In some cases, adjacent transmission lines 400*a*, 400*b*, 400*n* can share some components (e.g., ground lines). For example, the second conductive line 110 of the first transmission line 400*a* can be integral with, or the same component as, the first conductive line 108 of the second transmission line 400*b*. The second conductive portion 114 of the first transmission line 400*a* can be integral with, or the same component as, the first conductive portion 112 of the second transmission line 400*b*. The second shield element 138 of the first transmission line 400*a* can be integral with, or the same component as, the first shield element 136 of the second transmission line 400*b*. Some components vias can be shared between adjacent transmission lines 400*a*, 400*b*, 400*n*.

FIG. 12A to 12H shows steps or phases for an example method for making a transmission line 400. At FIG. 12A, a substrate 102*a* is provided. The substrate 102*a* can be a dielectric or insulating material. At FIG. 12B, a conductive layer 106 is formed (e.g., deposited, adhered or otherwise attached) on or over a second side of the substrate 102*a*. Holes can be formed in the substrate 102*a* and the holes can be filled with a conductive material to form vias 118 and 122 that are electrically coupled to the conductive layer 106. At block 12C, a layer of conductive material can be formed (e.g., deposited, adhered or otherwise attached) on or over a first side of the substrate 102*a*. The conductive material can be patterned to provide the first conductive portion 112 (e.g., electrically coupled to the vias 118) and the second conductive portion 114 (e.g., electrically coupled to the vias 122). At block 12D, dielectric material 102*b* can be formed (e.g., deposited, adhered or otherwise attached) on or over the substrate 102*a* and the first conductive portion 112 and the second conductive portion 114. Holes can be formed in the dielectric material 102*b* and the holes can be filled with a conductive material to form vias 116 (e.g., electrically coupled to the first conductive portion 112) and vias 120 (e.g., electrically coupled to the second conductive portion 114). At FIG. 12E, a layer of conductive material can be formed (e.g., deposited, adhered or otherwise attached) on or over the dielectric material 102*b*. The conductive material can be patterned to provide the signal line 104, the first conductive line 108 (e.g., electrically coupled to the vias 116), and the second conductive line 110 (e.g., electrically coupled to the vias 120). At FIG. 12F, dielectric material 102*c* can be formed (e.g., deposited, adhered or otherwise attached) on or over the dielectric material 102*b* and over the signal line 104, the first conductive line 108, and the second conductive line 110. Holes can be formed in the dielectric material 102*c* and the holes can be filled with a conductive material to form vias 154 (e.g., electrically coupled to the first conductive line 108) and vias 156 (e.g., electrically coupled to the second conductive line 156). At FIG. 12G, a layer of conductive material can be formed (e.g., deposited, adhered or otherwise attached) on or over the dielectric material 102*c*. The conductive material can be patterned to provide the first shield element 136 (e.g., electrically coupled to the vias 154), and the second shield element 138 (e.g., electrically coupled to the vias 156). Conductive material can be removed for form the gap between the first and second shield elements 136, 138, and the gap can be disposed directly above the signal line 104. At FIG. 12H, dielectric material 102*d* can be formed (e.g., deposited, adhered or otherwise attached) on or over the dielectric material 102*c*, such as to fill the gap between the first and second shield elements 136, 138. In some cases, additional dielectric material 102*d* can be formed (e.g., deposited, adhered or otherwise attached) on or over the first shield element 136 and/or the second shield element 138.

The conductive layer that forms the shield element(s) 136, 138 can be used to provide interconnecting pathways (e.g., traces) for interconnecting the transmission line to other components of the device, or to interconnect other components to each other. The conductive layer that form the conductive lines 108, 110, and/or the conductive layer that forms the conductive portions 112, 114, and/or the conductive layer 106 can be used to provide similar interconnecting pathways (e.g., for coupling between other components or for coupling to the transmission line). In some embodiments, the interconnecting pathways can be ground connections, and the interconnecting pathways can be electrically coupled to the portion of the corresponding conductive layer that forms the portion of the transmission line. In some cases, the interconnecting pathways can be separate and isolated from the portions of the conductive layer that form part of the transmission line, so that they can carry other signals.

Many variations are possible. For example, in some embodiments, FIG. 12H can be omitted and the gap between the first and second shield elements 136, 138 can be filled with air. In some cases, the conductive layer 106 can be used as the substrate, and the dielectric material 102*a* can be formed (e.g., deposited, adhered or otherwise attached) on or over the conductive layer 106. Additional layers can be added similar to the dielectric material 102*b*, the first and second conductive portions 112, 114, and the vias 116, 120, such as to build a taller stack of layers. In some cases, a single shield element 136 can be used, and the second shield element 138 can be omitted.

Figure 12A:
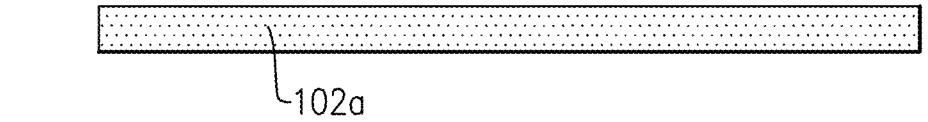
FIGS. 12A-12H shows stages of an example method for making a transmission line.
Figure 12B:
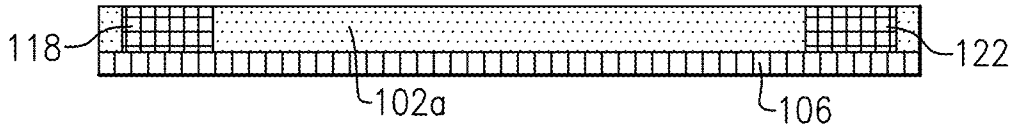
Figure 12C:
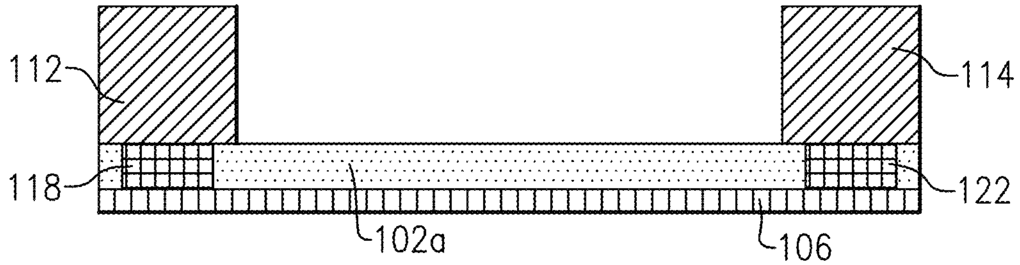
Figure 12D:
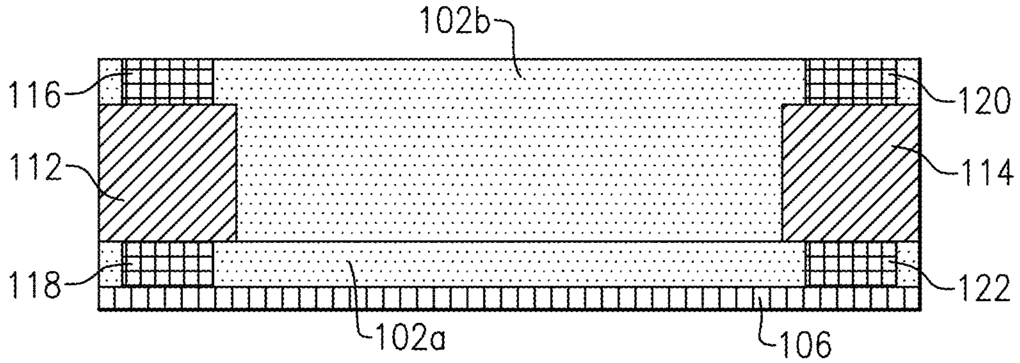
Figure 12E:
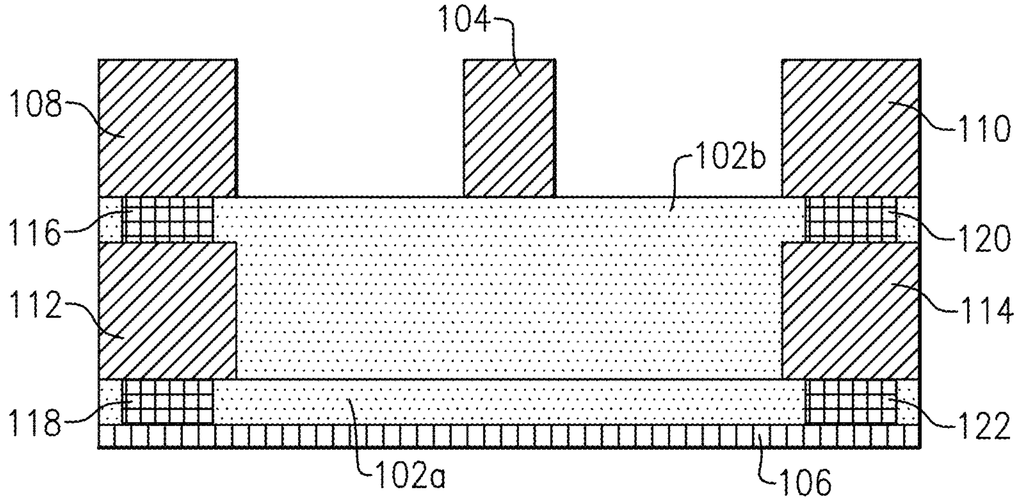
Figure 12F:
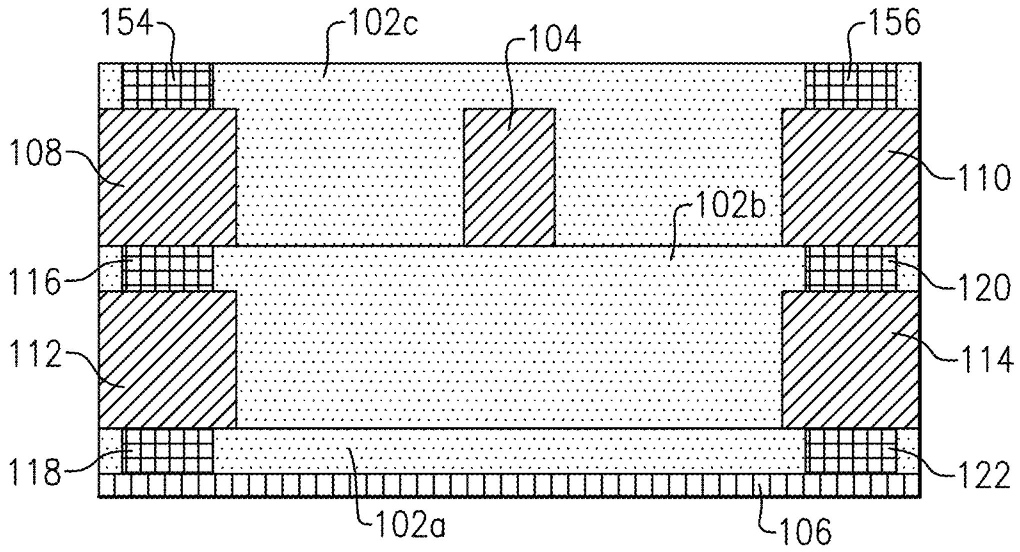
Figure 12G:
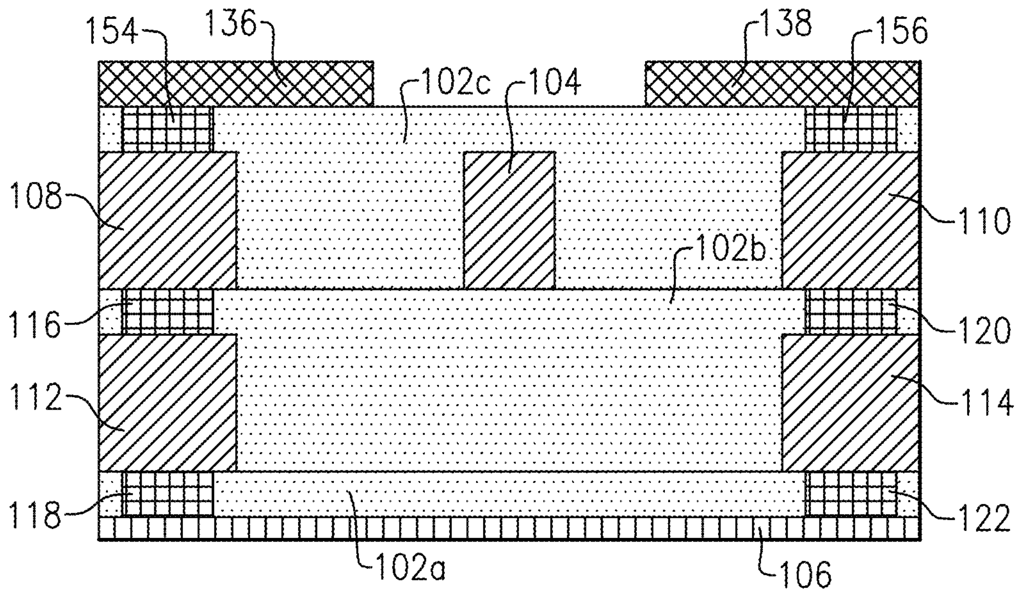
Figure 12H:
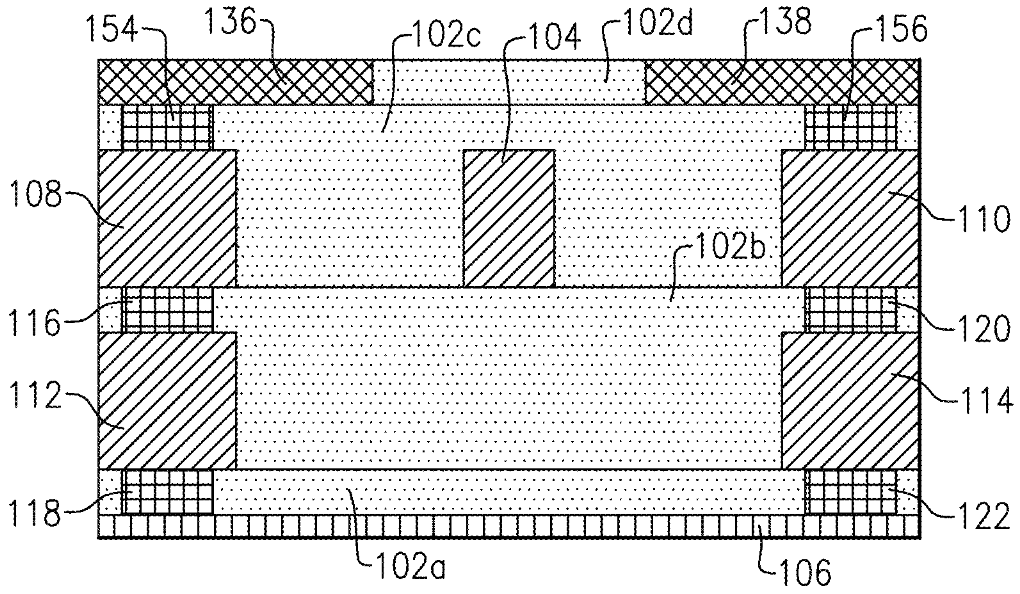
Figure 13:
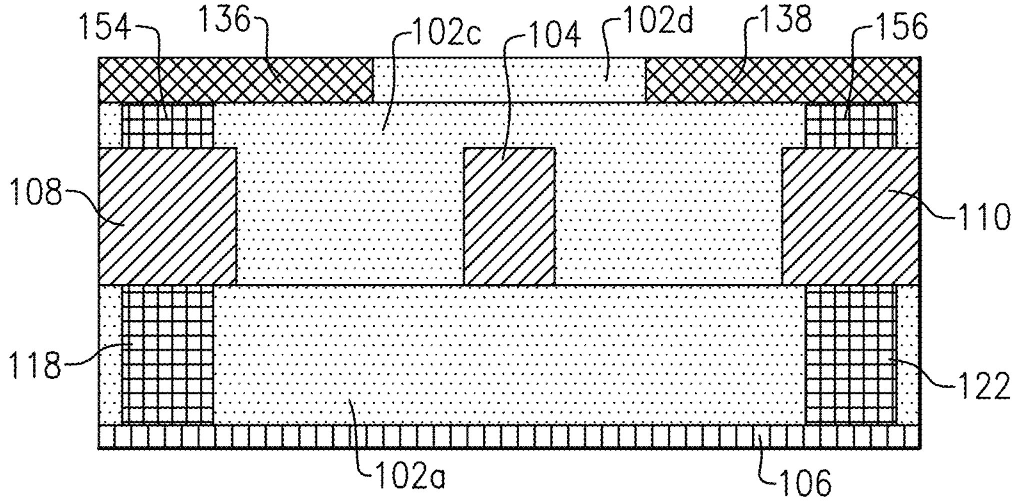
FIG. 13 is a cross-sectional view of another example of a transmission line.

With reference to FIG. 12H, in some cases, the dielectric material 102*b*, the first and second conductive portions 112, 114, and the vias 116, 120 can be omitted, as is the case in FIG. 13. For example, in some embodiments, the vias 118 and 122 as well as the dielectric or substrate layer 102 can be made thicker to space the signal line 104 away from the conductive layer 106, as shown in FIG. 13.

Figure 14:
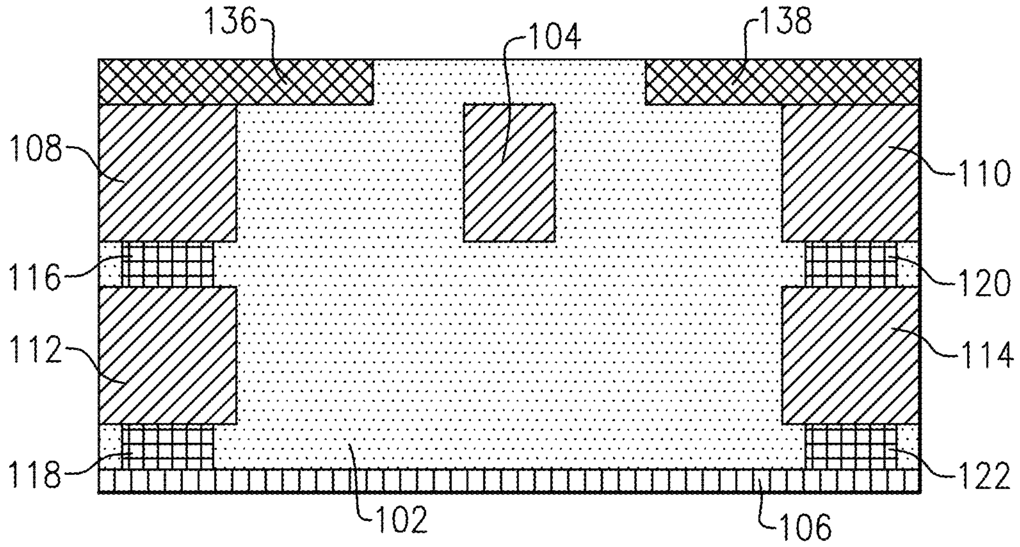
FIG. 14 is a cross-sectional view of another example of a transmission line.

In some embodiments, the vias 154 and 156 shown in FIG. 13 can be omitted, as shown in FIG. 14. The first shield layer 136 can be directly electrically connected to the first conductive line 108, and/or the second shield layer 138 can be directly electrically connected to the second conductive line 110. The top of the signal line 104 can substantially align at the same height as the bottoms of the first shield layer 136 and the second shield layer 138. For example, the distance 149 (e.g., in FIG. 6) can be zero.

Figure 15:
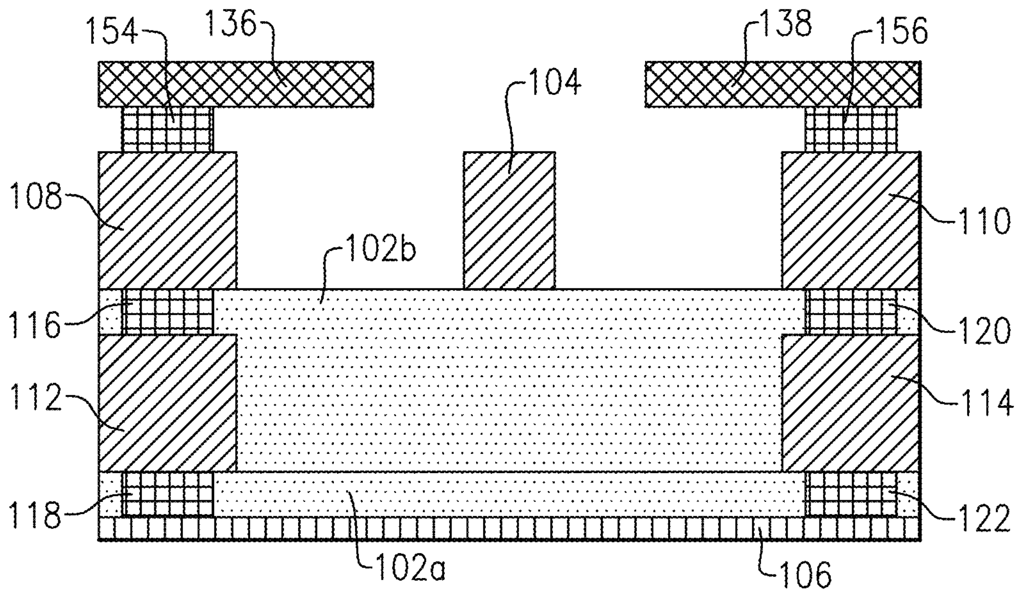
FIG. 15 is a cross-sectional view of another example of a transmission line.

With reference to FIG. 15, in some embodiments, the dielectric materials 102*c* and 102*d* shown in FIG. 13 can be omitted. In some cases, a sacrificial material can be used for layer 102*c*, and after FIG. 12G, the sacrificial layer 102*c* can be removed. The gaps between the signal line 104 and the first conductive line 108 and the second conductive line 110 can be filled with dielectric material (e.g., see FIG. 6) or air (e.g., see FIG. 15).

Figure 16:
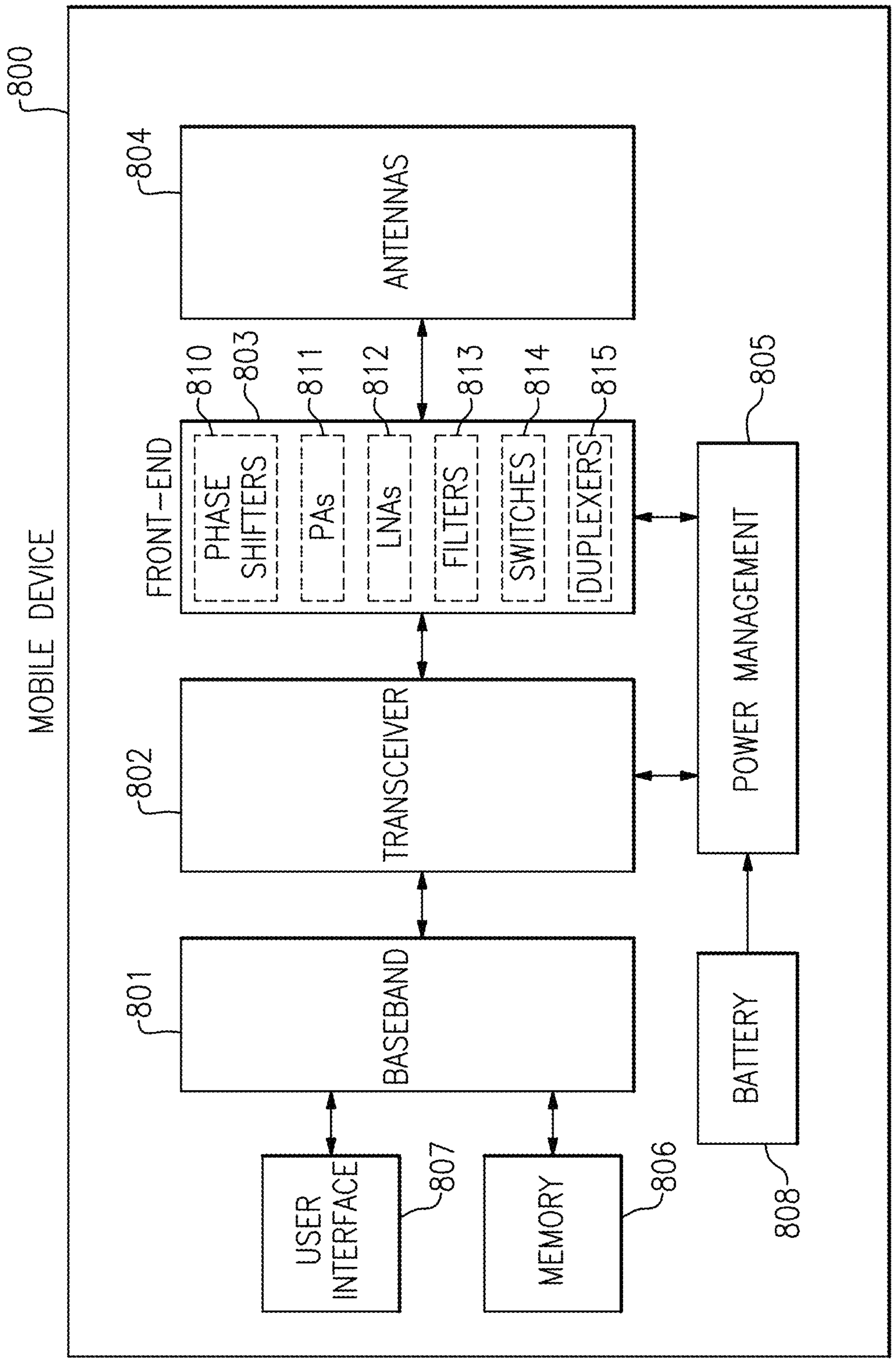
FIG. 16 is a schematic diagram of one embodiment of a mobile device.

FIG. 16 is a schematic diagram of one embodiment of a mobile device 800. The mobile device 800 can includes a baseband system 801, a transceiver 802, a front end system 803, one or more antennas 804, a power management system 805, a memory 806, a user interface 807, and a battery 808, or any combination thereof.

The mobile device 800 can be used to communicate using a wide variety of communications technologies, including, but not limited to, Second Generation (2G), Third Generation (3G), Fourth Generation (4G) (including Long-Term Evolution [LTE], LTE-Advanced, and LTE-Advanced Pro), Fifth Generation (5G) New Radio (NR), Wireless Local Area Network (WLAN) (for instance, Wi-Fi), Wireless Personal Area Network (WPAN) (for instance, Bluetooth and ZigBee), Wireless Metropolitan Area Network WMAN (for instance, WiMax), and/or Global Positioning System (GPS) technologies.

The transceiver 802 can generate RF signals for transmission and can process incoming RF signals received from the antennas 804. It will be understood that various functionalities associated with the transmission and receiving of RF signals can be achieved by one or more components that are collectively represented in FIG. 16 as the transceiver 802. In one example, separate components (for instance, separate circuits or dies) can be provided for handling certain types of RF signals. In some cases, the device can have separate receiver(s) and transmitter(s).

The front end system 803 can aid in conditioning signals transmitted to and/or received from the antennas 804. In the illustrated embodiment, the front end system 803 includes phase shifters 810, power amplifiers (PAs) 811, low noise amplifiers (LNAs) 812, filters 813, switches 814, and duplexers 815, although various alternative designs could be used.

The front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

The mobile device 800 can operate with beamforming. For example, the front end system 803 can include phase shifters 810 having variable phase controlled by the transceiver 802. In certain implementations, the transceiver 802 controls the phase of the phase shifters 810 based on data received from the processor 801.

The phase shifters 810 can be controlled to provide beam formation and directivity for transmission and/or reception of signals using the antennas 804. For example, in the context of signal transmission, the phases of the transmit signals provided to an antenna array used for transmission are controlled such that radiated signals combine using constructive and destructive interference to generate an aggregate transmit signal exhibiting beam-like qualities with more signal strength propagating in a given direction. In the context of signal reception, the phases are controlled such that more signal energy is received when the signal is arriving to the antenna array from a particular direction.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include one or more antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator. In certain implementations, the antennas 804 include one or more arrays of antenna elements to enhance beamforming.

The baseband system 801 can be coupled to the user interface 807 to facilitate processing of various user input and output (I/O), such as voice and data. The baseband system 801 can provide the transceiver 802 with digital representations of transmit signals, which the transceiver 802 processes to generate RF signals for transmission. The baseband system 801 can also process digital representations of received signals provided by the transceiver 802. As shown in FIG. 16, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 16, the power management system 805 can receive a battery voltage from the battery 808. The battery 808 can be any suitable battery for use in the mobile device 800, including, for example, a lithium-ion battery.

The mobile device 800 can include one or more transmission lines according to any of the various transmission line embodiments disclosed herein. The transmission lines can be used to send power and/or data signals between components. For example, the transmission lines can be used to interconnect components on a printed circuit board, or in any other suitable circuit or circuitry. By way of example, the transmission lines can couple the transceiver 802 to one or more of the antennas 804. The transmission lines can couple the power amplifiers 811 to various components for power delivery. The transmission lines can provide interconnections within a module on the mobile device 800, and/or the transmission lines can provide interconnections between modules of the mobile device 800. In some cases, transmission lines can be used to deliver a power signal that is used for power calibration, power detection, or power feedback.

Additional Information

Any of the embodiments described above can be implemented in association with mobile devices such as cellular handsets. The principles and advantages of the embodiments can be used for any systems or apparatus, such as any uplink wireless communication device, that could benefit from any of the embodiments described herein. The teachings herein are applicable to a variety of systems. Although this disclosure includes some example embodiments, the teachings described herein can be applied to a variety of structures. Any of the principles and advantages discussed herein can be implemented in association with RF circuits configured to process signals in a frequency range from about 30 kHz to 300 GHz, such as in a frequency range from about 450 MHz to 8.5 GHz.

Aspects of this disclosure can be implemented in various electronic devices. Examples of the electronic devices can include, but are not limited to, consumer electronic products, parts of the consumer electronic products such as packaged radio frequency modules, uplink wireless communication devices, wireless communication infrastructure, electronic test equipment, etc. Examples of the electronic devices can include, but are not limited to, a mobile phone such as a smart phone, a wearable computing device such as a smart watch or an ear piece, a telephone, a television, a computer monitor, a computer, a modem, a hand-held computer, a laptop computer, a tablet computer, a microwave, a refrigerator, a vehicular electronics system such as an automotive electronics system, a stereo system, a digital music player, a radio, a camera such as a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Unless the context indicates otherwise, throughout the description and the claims, the words "comprise," "comprising," "include," "including" and the like are to generally be construed in an inclusive sense, as opposed to an exclusive or exhaustive sense; that is to say, in the sense of "including, but not limited to." Conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

While certain embodiments have been described, these embodiments have been presented by way of example only, and are not intended to limit the scope of the disclosure. Indeed, the novel resonators, devices, modules, apparatus, methods, and systems described herein may be embodied in a variety of other forms. Furthermore, various omissions, substitutions and changes in the form of the resonators, devices, modules, apparatus, methods, and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and/or acts of the various embodiments described above can be combined to provide further embodiments. The accompanying claims and their equivalents are intended to cover such forms or modifications as would fall within the scope and spirit of the disclosure.

What is claimed is:

1. A transmission line comprising:

a first conductive layer, a dielectric layer over the first conductive layer, and a second conductive layer over the dielectric layer and including first and second portions electrically connected to the first conductive layer and a third portion between the first portion and the second portion;

a third conductive layer over the second conductive layer and including a first portion that has a width greater than, covers at least a portion of, and extends inward past an end of, the first portion of the second conductive layer, and extends towards the third portion of the second conductive layer, the third conductive layer including a second portion that has a width greater than, covers at least a portion of, and extends inward past an end of, the second portion of the second conductive layer, and extends towards the third portion of the second conductive layer;

an intermediate conductive layer, a first portion of the intermediate conductive layer between the first portion of the second conductive layer and the first conductive layer, a second portion of the intermediate conductive layer between the second portion of the second conductive layer and the first conductive layer; and a gap between the inward extending end of the first portion of the third conductive layer and the inward extending end of the second portion of the third conductive layer, the gap positioned directly over the third portion of the second conductive layer and the gap having a width greater than the width of the third portion of the second conductive layer.

2. The transmission line of claim 1 further comprising:

one or more first interconnectors that extend through the dielectric layer to provide an electrical connection between the first conductive layer and the first portion of the second conductive layer; and one or more second interconnectors that extend through the dielectric layer to provide an electrical connection between the first conductive layer and the second portion of the second conductive layer.

3. The transmission line of claim 1 wherein the transmission line is a grounded coplanar waveguide.

4. The transmission line of claim 1 further comprising one or more vias that electrically couple the first portion of the third conductive layer to the first portion of the second conductive layer, and one or more vias that electrically couple the second portion of the third conductive layer to the second portion of the second conductive layer.

5. The transmission line of claim 1 wherein dielectric material fills a first gap between the first portion of the second conductive layer and the third portion of the second conductive layer, and the dielectric material fills a second gap between the second portion of the second conductive layer and the third portion of the second conductive layer.

6. The transmission line of claim 5 wherein the dielectric material supports an overhang portion of the first portion of the third conductive layer that extends inward past the end of the first portion of the second conductive layer, and the dielectric material supports an overhang portion of the second portion of the third conductive layer that extends inward past the end of the second portion of the second conductive layer.

7. A method of making a transmission line, the method comprising:

providing a dielectric material;

forming a conductive layer over a first side of the dielectric material;

patterning the conductive layer to have a first portion, a second portion, and a third portion that is positioned between the first portion and the second portion;

forming an additional conductive layer over the first conductive layer;

patterning the additional conductive layer to have a first portion and a second portion separated by a gap, the first portion of the additional conductive layer covering at least part of the first portion of the conductive layer and extending inward past an end of the first portion of the conductive layer, the second portion of the additional conductive layer covering at least part of the second portion of the conductive layer and extending inward past an end of the second portion of the conductive layer, the first and second portions of the additional conductive layer each having a width greater than a respective width of the first and second portions of the conductive layer, the gap being between inward extending ends of the first and second portions of the additional conductive layer positioned directly over the third portion of the conductive layer, and the gap having a width greater than the width of the third portion of the conductive layer; and forming a ground plane conductive layer over a second side of the dielectric material.

8. The method of claim 7 wherein the transmission line is a coplanar waveguide.

9. The method of claim 7 further comprising forming additional dielectric material in a first gap between the first portion of the conductive layer and the third portion of the conductive layer, and in a second gap between the second portion of the conductive layer and the third portion of the conductive layer.

10. The method of claim 9 further comprising forming the additional dielectric material over the conductive layer so that the additional dielectric material supports an overhang portion of the first portion of the additional conductive layer that extends inward past an end of the first portion of the conductive layer, and so that the additional dielectric material supports an overhang portion of the second portion of the additional conductive layer that extends inward past an end of the second portion of the conductive layer.

11. The method of claim 7 further comprising forming one or more first interconnectors that extend through the dielectric material to electrically couple the first portion of the conductive layer to the ground plane conductive layer, and forming one or more second interconnectors that extend through the dielectric material to electrically couple the second portion of the conductive layer to the ground plane conductive layer.

12. The method of claim 7 further comprising:

forming an intermediate conductive layer between the dielectric material and the conductive layer; and patterning the intermediate conductive layer to provide a first portion and a second portion, the first portion of the conductive layer being provided directly above the first portion of the intermediate conductive layer, the second portion of the conductive layer being provided directly above the second portion of the intermediate conductive layer.

13. The method of claim 12 further comprising:

forming one or more first vias to electrically interconnect the first portion of the conductive layer to the first portion of the intermediate conductive layer;

forming one or more second vias to electrically interconnect the first portion of the intermediate conducive layer to the ground plane conductive layer;

forming one or more third vias to electrically interconnect the second portion of the conductive layer to the second portion of the intermediate conductive layer; and forming one or more fourth vias to electrically interconnect the second portion of the intermediate conducive layer to the ground plane conductive layer.

14. The method of claim 13, further comprising:

forming one or more fifth vias to electrically interconnect the first portion of the additional conductive layer to the first portion of the conductive layer; and forming one or more sixth vias to electrically interconnect the second portion of the additional conducive layer to the second portion of the conductive layer.

15. A transmission line comprising:

a dielectric material;

a layer of conductive material disposed over the dielectric material, the layer of conductive material having a first portion, a second portion, and a third portion that is positioned between and spaced apart from the first portion and the second portion;

a ground plane conductive layer over a second side of the dielectric material; and an additional conductive layer over the layer of conductive material, the additional conductive layer having a first portion and a second portion separated by a gap, the first portion of the additional conductive layer covering at least part of the first portion of the conductive layer and extending inward past an end of the first portion of the conductive layer, the second portion of the additional conductive layer covering at least part of the second portion of the conductive layer and extending inward past an end of the second portion of the conductive layer, the first and second portions of the additional conductive layer each having a width greater than a respective width of the first and second portions of the conductive layer, the gap being between inward extending ends of the first and second portions of the additional conductive layer positioned directly over the third portion of the conductive layer, and the gap having a width greater than the width of the third portion of the conductive layer.

16. The transmission line of claim 15 further comprising additional dielectric material in a first gap between the first portion of the conductive layer and the third portion of the conductive layer, and in a second gap between the second portion of the conductive layer and the third portion of the conductive layer.

17. The transmission line of claim 16 wherein the additional dielectric material is disposed over the conductive layer so that the additional dielectric material supports an overhang portion of the first portion of the additional conductive layer that extends inward past an end of the first portion of the conductive layer, and so that the additional dielectric material supports an overhang portion of the second portion of the additional conductive layer that extends inward past an end of the second portion of the conductive layer.

18. The transmission line of claim 15 wherein the transmission line is a coplanar waveguide.

19. The transmission line of claim 15, further comprising:

one or more first interconnectors that extend through the dielectric material to electrically couple the first portion of the conductive layer to the ground plane conductive layer; and one or more second interconnectors that extend through the dielectric material to electrically couple the second portion of the conductive layer to the ground plane conductive layer.

20. The transmission line of claim 15 further comprising an intermediate conductive layer between the dielectric material and the conductive layer, the intermediate conductive layer having a first portion spaced apart from a second portion, the first portion of the intermediate conductive layer directly below the first portion of the conductive layer, and the second portion of the intermediate conductive layer directly below the second portion of the conductive layer.

21. The transmission line of claim 20 further comprising:

one or more first vias that electrically interconnect the first portion of the conductive layer to the first portion of the intermediate conductive layer;

one or more second vias that electrically interconnect the first portion of the intermediate conducive layer to the ground plane conductive layer;

one or more third vias that electrically interconnect the second portion of the conductive layer to the second portion of the intermediate conductive layer; and one or more fourth vias that electrically interconnect the second portion of the intermediate conducive layer to the ground plane conductive layer.

22. The transmission line of claim 21, further comprising:

one or more fifth vias that electrically interconnect the first portion of the additional conductive layer to the first portion of the conductive layer; and one or more sixth vias that electrically interconnect the second portion of the additional conducive layer to the second portion of the conductive layer.

* * * * *